US005608447A

United States Patent [19]
Farry et al.

[11] Patent Number: 5,608,447
[45] Date of Patent: Mar. 4, 1997

[54] FULL SERVICE NETWORK

[75] Inventors: George A. Farry, Fairfax, Va.; John A. Bigham, Pottstown, Pa.; Kenneth R. Brooks, Middletown; Amos H. Lucas, Jr., Baltimore, both of Md.; Colton E. O'Donoghue, Jr., Haddonfield, N.J.

[73] Assignee: Bell Atlantic, Arlington, Va.

[21] Appl. No.: 250,792

[22] Filed: May 27, 1994

[51] Int. Cl.⁶ .................................................. H04N 7/173
[52] U.S. Cl. ............................ 348/7; 348/12; 455/3.1; 455/4.2
[58] Field of Search ............................ 348/6, 7, 12, 13; 455/3.1, 4.2, 5.1, 6.1; 358/86; 370/60.1, 73, 94.1, 60; H04N 7/16, 7/173

[56] References Cited

U.S. PATENT DOCUMENTS

| | | |
|---|---|---|
| Re. 34,611 | 5/1994 | Fenwick et al. . |
| 4,124,773 | 11/1978 | Elkins . |
| 4,475,123 | 10/1984 | Dumbauld et al. . |
| 4,484,218 | 11/1984 | Boland et al. . |
| 4,709,418 | 11/1987 | Fox et al. . |
| 4,763,317 | 8/1988 | Lehman et al. . |
| 4,829,372 | 5/1989 | McCalley et al. . |
| 4,894,789 | 1/1990 | Yee . |
| 4,993,017 | 2/1991 | Bachinger et al. . |
| 4,994,909 | 2/1991 | Graves et al. . |
| 5,010,499 | 4/1991 | Yee . |
| 5,010,545 | 4/1991 | Jacob . |
| 5,016,272 | 5/1991 | Stubbs et al. . |
| 5,027,400 | 6/1991 | Baji et al. ................................... 348/10 |
| 5,050,164 | 9/1991 | Chao et al. . |
| 5,072,441 | 12/1991 | Szwarc . |
| 5,093,718 | 3/1992 | Hoarty et al. . |
| 5,099,473 | 3/1992 | Gupta et al. . |
| 5,113,391 | 5/1992 | Gupta et al. . |
| 5,115,426 | 5/1992 | Spanke . |
| 5,117,429 | 5/1992 | Lagoutte . |
| 5,121,476 | 6/1992 | Yee . |
| 5,132,992 | 7/1992 | Yurt et al. . |
| 5,133,079 | 7/1992 | Ballantyne et al. . |
| 5,136,411 | 8/1992 | Paik et al. . |
| 5,142,532 | 8/1992 | Adams . |
| 5,172,413 | 12/1992 | Bradley et al. . |
| 5,181,106 | 1/1993 | Sutherland . |
| 5,189,673 | 2/1993 | Burton et al. . |
| 5,191,456 | 3/1993 | Sutherland et al. . |
| 5,195,092 | 3/1993 | Wilson et al. . |
| 5,200,952 | 4/1993 | Bernstein et al. . |
| 5,206,722 | 4/1993 | Kwan . |
| 5,216,669 | 6/1993 | Hofstetter et al. . |
| 5,220,420 | 6/1993 | Hoarty et al. . |
| 5,229,992 | 7/1993 | Jurkevich et al. . |
| 5,231,494 | 7/1993 | Wachob . |
| 5,243,593 | 9/1993 | Timbs . |
| 5,245,420 | 9/1993 | Harney et al. . |
| 5,247,347 | 9/1993 | Litteral et al. . |
| 5,247,635 | 9/1993 | Kamiya . |
| 5,251,209 | 10/1993 | Jurkevich et al. . |
| 5,253,275 | 10/1993 | Yurt et al. . |
| 5,253,341 | 10/1993 | Rozmanith et al. . |

(List continued on next page.)

OTHER PUBLICATIONS

Mark Dziatkiewicz, "Pac Bell Positions for Hollywood Paradigm Shift", America's Network, Jun. 1, 1994, pp. 56–58.

Primary Examiner—John K. Peng
Assistant Examiner—Chris Grant
Attorney, Agent, or Firm—Lowe, Price, LeBlanc & Becker

[57] ABSTRACT

A digital switching network is described which accommodates a full range of broadband and narrowband digital technologies, including video, wideband data, narrowband data, video-on-demand and telephone channels in an integrated manner. Optical fiber connects information sources to the switching component of the network utilizing a standardized transport stream such as SONET OC-N. A broadband ATM switch, a digital cross-connect switch or other distribution mechanisms may be utilized to interconnect information sources and subscribers. A level 1 gateway is utilized to control access to all information resources on the network.

25 Claims, 11 Drawing Sheets

U.S. PATENT DOCUMENTS

| | | | |
|---|---|---|---|
| 5,262,883 | 11/1993 | Pidgeon | 348/6 |
| 5,262,906 | 11/1993 | Mazzola . | |
| 5,282,207 | 1/1994 | Jurkevich et al. . | |
| 5,289,272 | 2/1994 | Rabowsky et al. . | |
| 5,293,633 | 3/1994 | Robbins . | |
| 5,303,229 | 4/1994 | Withers et al. . | |
| 5,341,474 | 8/1994 | Gelman | 348/12 |
| 5,367,329 | 11/1994 | Nakagaki et al. | 348/1 |
| 5,387,927 | 2/1995 | Look et al. | 348/7 |
| 5,408,469 | 4/1995 | Opher et al. | 370/60.1 |
| 5,410,343 | 4/1995 | Coddington et al. | 348/12 |

FULL SERVICE NETWORK

TECHNICAL FIELD

The present invention relates to communications networks and more particularly to digital communications network architectures for carrying a full range of digital communication services such as video-on-demand, information services, broad or narrow band data services and telephony.

BACKGROUND ART

Telephone networks of various kinds are known in the prior art. Similarly known are Community Antenna Television (CATV) video distribution systems of various kinds.

Some commentaries speculate that digital systems will provide 500 channels of video information into each subscriber's home in the near future. The trend in development work on video distribution, as in many communication industries, is toward all digital transmissions. In particular, a number of systems have recently been proposed for distributing video information in compressed, digital data form.

The prior art, however, is limited in the degree to which telephone and video distribution have been integrated. Other digital services generally operate over specialized networks. There is a need for a full service network which can accommodate a full range of digital services.

U.S. Pat. No. 5,247,347 to Litteral et al., assigned in common with the present invention and herein incorporated in its entirety by reference, integrates a public switched telephone network with video-on-demand service. The video-on-demand system shown in this patent adopts existing components of the Public Switched Telephone Network (PSTN) and implements compression techniques to store video information for subsequent forwarding over interoffice facilities. The switching facilities are located in central offices (COs) serving residential customers or subscribers. Electronic devices associated with the subscriber loops modify the transmission characteristics of the subscriber loops to permit delivery of full motion video information over existing loop plant facilities. The Litteral patent discloses the use of Asymmetric Digital Subscriber Line (ADSL) interface units for providing video-on-demand to subscribers from the central office.

U.S. patent application Ser. No. 08/233,579, in the name of Bruce Kostreski, filed Apr. 26, 1994, assigned to the common assignee and entitled Extended Range Video On Demand Distribution System (docket no. 680-074), the disclosure of which is herein incorporated in its entirety by reference, describes improvements in ADSL distribution of video to subscribers in which fiber optic links are used to connect video sources at a central office to remote intermediate distribution points from which ADSL links provide the connection to subscribers' premises.

The networks of the prior art typically have not been designed to accommodate a full range of digital services such as telephone, video, video-on-demand, data services, information services, interactive services, and other modern digital offerings.

Specifically, prior art networks typically have not been capable of the wide bandwidth required to deliver broadband services such as real time video to subscribers premises.

Further, prior art networks typically have not been capable of:

providing low routing delays needed for interactive type of services, handling video broadcast services to all subscribers, centrally managing video services, providing individualized video services at the request of the subscriber, or connecting video, wide band data, narrow band data, and telephone information in an integrated manner.

DISCLOSURE OF THE INVENTION

One advantage of the invention is in allowing a full range of digital services such as telephone, video, video-on-demand, data services, information services, interactive services, and other modern digital offerings to be serviced by the same network.

Another advantage of the invention is in delivering broadband services such as real time video, to subscribers premises together with telephone service.

Another advantage is in creation of a network with the low routing delays needed for interactive type of services.

Another advantage of the invention is in simultaneous delivery of video broadcast services to a plurality subscribers.

Another advantage is in managing all video services with a centralized network manager.

Another advantage of the invention is the delivery of individualized video services selected upon request by the subscriber.

Another advantage is in connecting individual providers of video, wide band data, narrow band data, and telephone information to subscribers in an integrated manner.

To achieve the above and other advantages, the invention is directed to a network for the distribution of information, including video information, to subscribers. The network includes plural sources of information, plural subscribers, a distribution component for providing information from the sources to those subscribers and first gateway means for authorizing establishment of a video connection between a source of information and a subscriber.

The network utilizes optical fiber to connect sources and subscribers to the distribution component and the fiber carries a standardized transport stream such as a SONET OC-12 transport stream. An adaptive digital multiplexer/demultiplexer permits unused digital capacity on an optical fiber to be allotted to other video sources.

The networks disclosed herein may utilize one of several different distribution components. One such component may be one or more video bridging devices which provide duplicate copies of input signals to a plurality of output lines. Another may be an ATM video switch. Another may be a digital cross-connect switch. Another may be a fully connected network.

A gateway, called a level 1 gateway, connects to a signalling network, such as an X.25 network, capable of transmitting signalling to the distribution component (as well as to a PVC controller) and to and from the subscribers. The level 1 gateway manages the establishment of connections between subscribers and the information sources. It provides necessary menus to guide the selection of the information desired by the subscriber.

The distribution component can use one of two types of interfaces to subscribers and information sources. One of such interfaces includes an intelligent access peripheral (IAP). Another includes an Optical Network Unit (ONU).

The intelligent access peripheral stores profile information on each subscriber. In addition, it contains two back plane busses, one serving as a broadcast bus and one serving as a point to point bus.

The physical medium utilized to connect sources of information to the distribution component typically includes optical fiber or coaxial cable whereas the physical medium utilized to connect subscribers to the distribution component is copper pair or coax or both. The physical medium between the distribution component and the subscriber may also be utilized to provide power to the subscriber end devices and subscriber interface devices.

A digital entertainment terminal at the subscriber's location provides all necessary user functions for the use of the network.

Still other advantages of the present invention will become readily apparent to those skilled in this art from the following detailed description, in which more than one embodiment is described by way of illustration of the best mode contemplated for carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

These and other objects of the invention are achieved in a full service network disclosed in more detail hereinafter in which.

BEST MODE FOR CARRYING OUT THE INVENTION

The invention is disclosed with reference to three specific types of information sources, namely video broadcasting, video-on-demand and telephony. However, the network will accommodate a full range of broadband and narrow band digital technologies.

With respect to video broadcasting, information sources may include a CATV head end, a video source which arrives over a switched network, a live source or a satellite feed.

Telephone sources may include analog channels, digital channels such as ISDN, multiplex channels or switched telephone channels.

Video-on-demand sources should be considered to be typical of not only sources of video programing but of a full variety of interactive information and entertainment services as well.

Each particular information source may require its own source interface to ensure compatibility with the ports of the distribution component.

Similarly, for purposes of disclosing specific examples of network implementation, two main categories of subscriber interface exist, namely, the optical network unit and the intelligent access peripheral.

Figure 1:
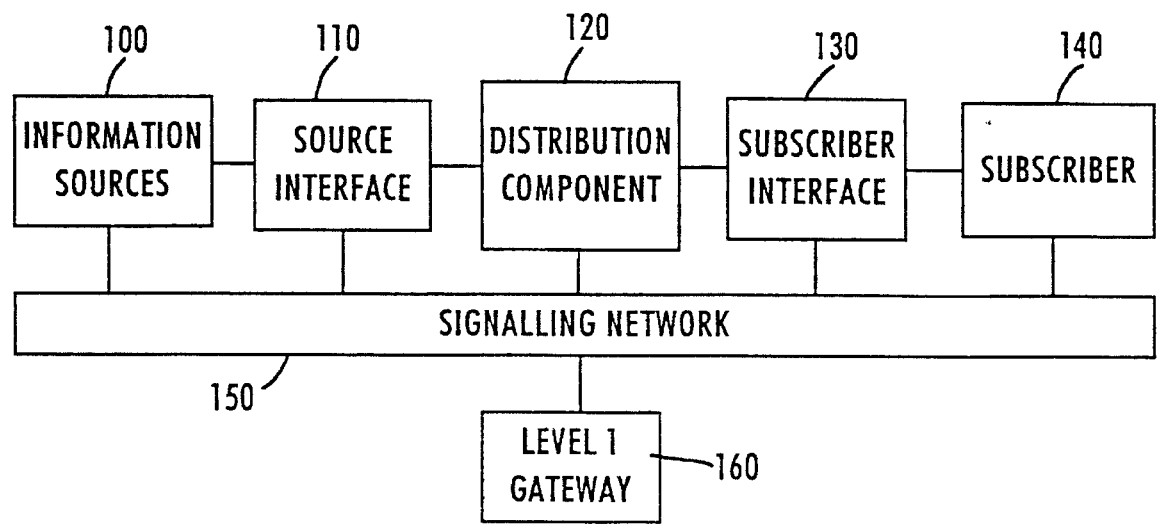
FIG. 1 represents a high level representation of the network architecture of the full service digital network.

FIG. 1 depicts a high level overview of the architecture of the network of the invention. One or more information sources 100 are connected to a distribution component (e.g. a digital switch) 120 by way of a source interface 110. Information from sources 100 are distributed to subscribers 140 by the distribution component 120 and the interconnection between the distribution network 120 and the subscribers 140 occurs over subscriber interface 130. A Level 1 gateway 160 provides, inter alia, access control to services provided over the network by information sources 100 by way of signalling network 150 to network elements.

When a subscriber desires access to digital services, the subscriber connects initially to the level 1 gateway which then manages the setup of the desired service(s) for the subscriber.

Particular subscriber equipment and the level 1 gateway will be addressed in more detail hereinafter.

Figure 2:
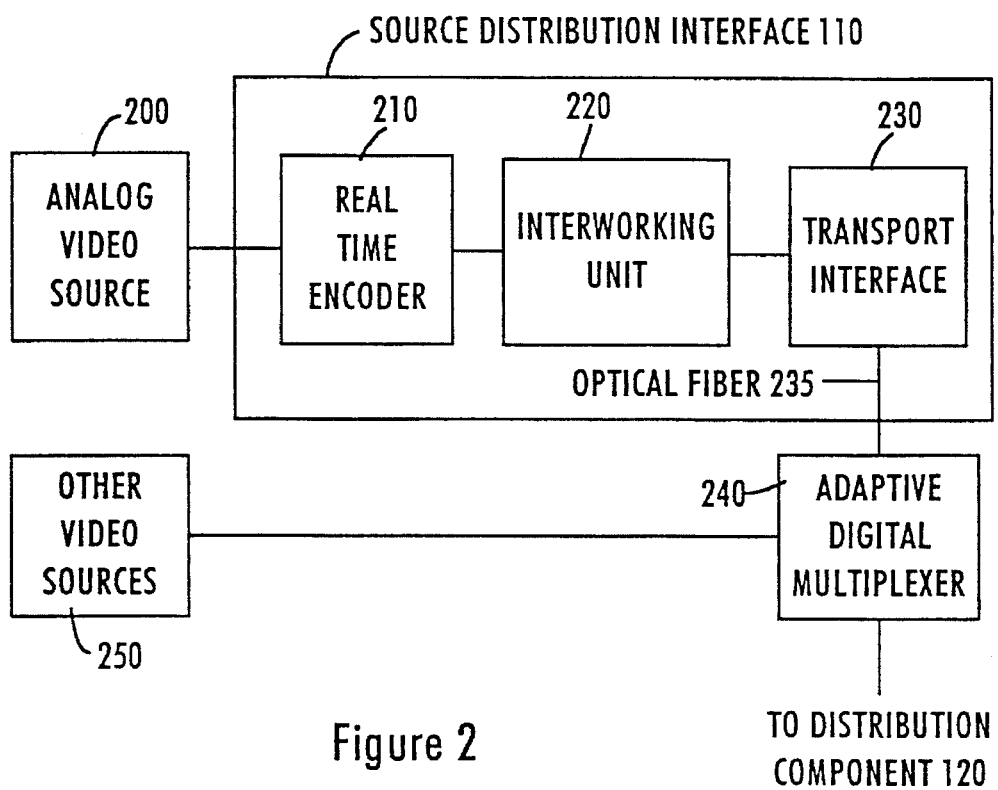
FIG. 2 represents a source interface between video sources and the distribution component of the network.

Turning to FIG. 2, a baseband analog video source 200 is applied to real time encoder 210. The analog video source may originate remotely or locally as long as it is baseband analog video when it reaches the real time encoder. The real time encoder 210 digitizes the audio and video signals and performs data compression. In a preferred embodiment, the encoder will encode the program signal into an MPEG-2 format. MPEG (motion picture experts' group) is a standard for digitized video. A number of specific algorithms will satisfy MPEG requirements. MPEG-2 is a second generation standard for encoding video program material into a 6.312 Mbit/sec bit stream.

The illustrated real time encoder is preferably set up as a bank of encoders to process six sets of analog audio/video program signals in parallel. As such, the bank of encoders 210 produces six 6.312 Mbit/sec MPEG-2 bit streams, which are combined together with appropriate overhead information into a single 45.736 Mbit/sec DS-3 type signal. The DS-3 signal from the encoder 210 is input to an interworking unit (IWU) 220.

The full service digital network uses asynchronous transfer mode (ATM) processing for all video information, including broadcast video information. ATM is a packet oriented time division multiplexing technique. In ATM, information is organized into cells having a fixed length and format. Each cell includes a header, primarily for identifying cells relating to the same virtual connection, and an information field or "payload." In one proposal, a 53 octet (i.e., grouping of 8 bits) ATM cell would include a cell header consisting of five octets and a payload consisting of 48 octets of data. Transfer is asynchronous in the sense that the recurrence of cells that contain information from any particular sender is not necessarily periodic. Each user submits a cell for transfer when the user has a cell to send, and not when a particular assigned or available transmission time slot occurs. ATM accommodates an arbitrary information transfer rate up to the maximum supported by the link or switching network simply by transmitting cells more often as more bandwidth is needed.

In one implementation, all video information will be transferred at a constant, standardized bit rate. However, other implementations will utilize ATM capabilities to permit different bit rates from different sources or even different bit rates from the same source during communications on an as needed basis.

The interworking unit 220 prepares the MPEG2 bit streams from real time encoder 210 for ATM cell stream transmission over optical fiber transport links. For example, the interworking unit will divide the bit stream into appropriate length payloads and combine the payload data with appropriate cell headers necessary for ATM transport.

SONET (synchronous optical network) is a relatively new hierarchy of optical standards that can be expected to replace the present digital signal hierarchy such as DS-1 and DS-3. SONET is also known as the synchronous digital hierarchy (SDH). SONET standards are defined in forty-eight increments. OC-1 (office channel 1), the lowest level on the hierarchy, is the basic SONET building block. OC-1 can carry and become the envelope for a DS-3 (45.736 Mbit/sec) signal. In the SONET design, OC-1 is known as synchronous transport signal-level 1 (STS-1), which has a synchronous frame structure and a speed of 51.840 Mbit/sec. The synchronous frame structure makes it possible to extract DS-1 signals without disassembling the entire frame. Other levels in the hierarchy include OC-3 with a line rate of 155.520 Mbit/sec, OC-12 with a line rate of 622.080 Mbit/sec and OC-48 with a line rate of 2,488.320 Mbit/sec.

In one implementation, optical fiber links such as fiber 235 or the optical fiber(s) connecting adaptive digital multiplexer 240 to distribution component 120 would operate at an OC-12 bit rate. Other implementations would utilize OC-48.

By way of example, assuming the use of OC-12, one transport link will normally carry the equivalent of twelve DS-3's. However, conversion into ATM cell format with associated headers imposes added overhead requirements beyond that required to carry 12 DS-3's. In the preferred OC-12 implementation, one interworking unit 220 therefore processes up to ten DS-3 signals to produce an ATM bit stream at the OC-12 rate.

A transport interface 230 converts the electrical signal from the interworking unit 220 into an optical signal and transmits the optical signal through fiber 235 to an optional adaptive digital multiplexer (ADM) 240.

The ADM 240 performs three functions, passive bridging, active bridging and video channel add/drop. The three functions may be performed separately but, the preferred embodiment would be performed by elements co-located within one network component ADM 240.

In operation, if the number of video sources service by transport interface 230 were less than that required to fully occupy an OC-12 fiber, video information from other video sources could be added by ADM 240. If it were desired to drop certain channels from optical fiber 235 for distribution at the ADM 240 location, the bridging function would permit the signals to be dropped. Clearly, the bridging could be either active (e.g., with signal regeneration and/or time slot relocation) or passive (e.g., signal splitter).

As noted above, the real time encoders 120 each output a single DS-3 signal comprising up to six MPEG-2 bit streams. The interworking unit 220 processes up to ten DS-3 signals to produce an ATM bit stream at the OC-12 rate. Consequently, a broadcast video source 200 may produce as many as sixty channels of CATV type broadcast programming for transport over one OC-12 type SONET optical fiber 235.

Many providers, however, may not choose to broadcast so many channels. For example, a provider operating video source 200 may offer only forty-two channels. Such an ATM channel transmission on the optical fiber 235 will not utilize the entire OC-12 channel capacity of that fiber. In the specific example, the forty-two channels require the equivalent of only seven of the available ten DS-3's.

The architecture shown in FIG. 2 permits a second broadcast service provider to utilize the transport capacity not used by the first provider. The second broadcast service provider would offer additional channels from a separate second source 250. The source 250 can be essentially identical in structure and operation to the source 200 up to transport interface 230, but the source will offer only the number of channels necessary to fill the OC-12 transport capacity. In the example, if the source 200 transmits forty-two channels (seven DS-3's) via the fiber 235, second source 250 could transmit up to eighteen additional channels (three DS-3's). The function of insertion in ADM 240 is to combine the signals from the two sources into a single OC-12 rate signal (ten DS-3's in ATM cell format) for further transmission through the optical network.

Figure 3:
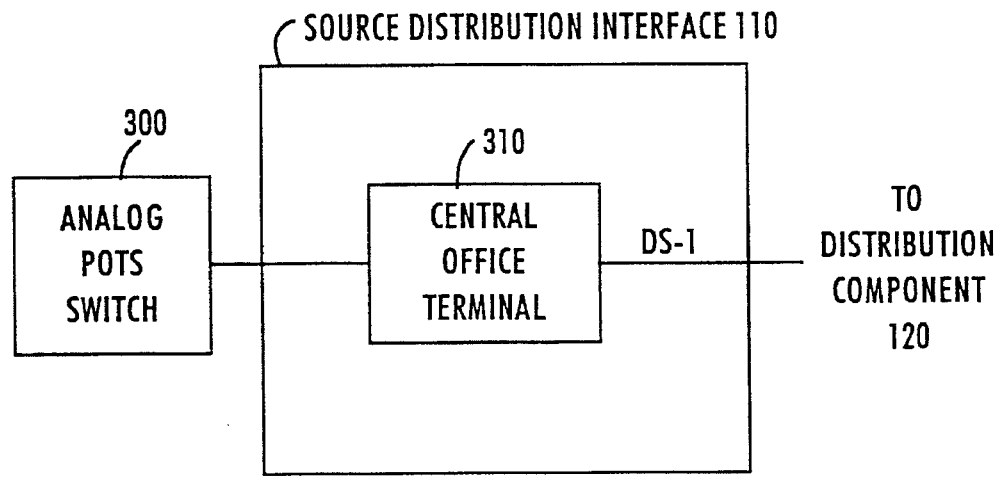
FIG. 3 represents a source interface for interconnecting an analog POTS (plain old telephone service) switch to the distribution component of the network.
Figure 4:
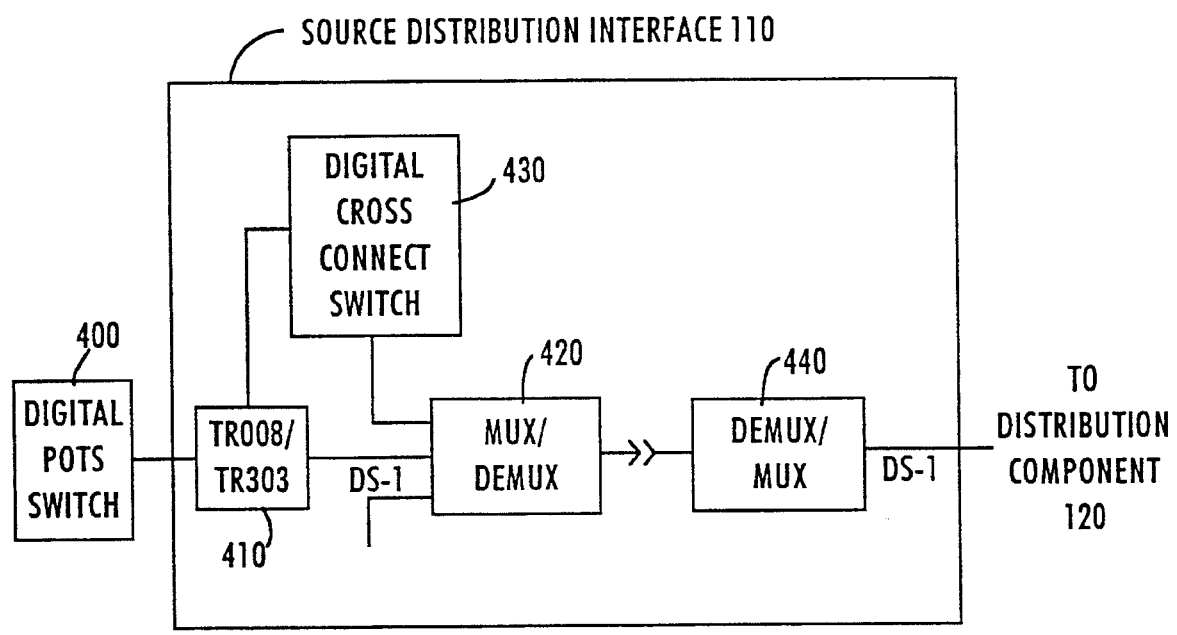
FIG. 4 represents a source interface for interconnecting a digital POTS switch to the distribution component of the network.

The full service network illustrated in FIG. 1 also provides narrowband transport for voice and narrowband data services. This is illustrated in FIGS. 3 and 4 with respect to an example of providing plain old telephone service (POTS) for customers of the full service network. In FIG. 3, telephone channels originating from an analog POTS switch 300 are converted to digital and multiplexed into, for example, a DS-1 group for transmission to the distribution component 120. Demultiplexing and digital-to-analog conversion occur in the reverse direction.

In FIG. 4, a digital POTS switch 400 provides DS-1 type digital input/output ports through interfaces conforming to either TR-008 or TR-303. Digital POTS traffic can also arrive over one or more switches (e.g. digital cross-connect switches 430). Digital channels destined for the distribution component 120 can optionally be multiplexed as shown as items 420 and 440 of FIG. 4.

Figure 5:
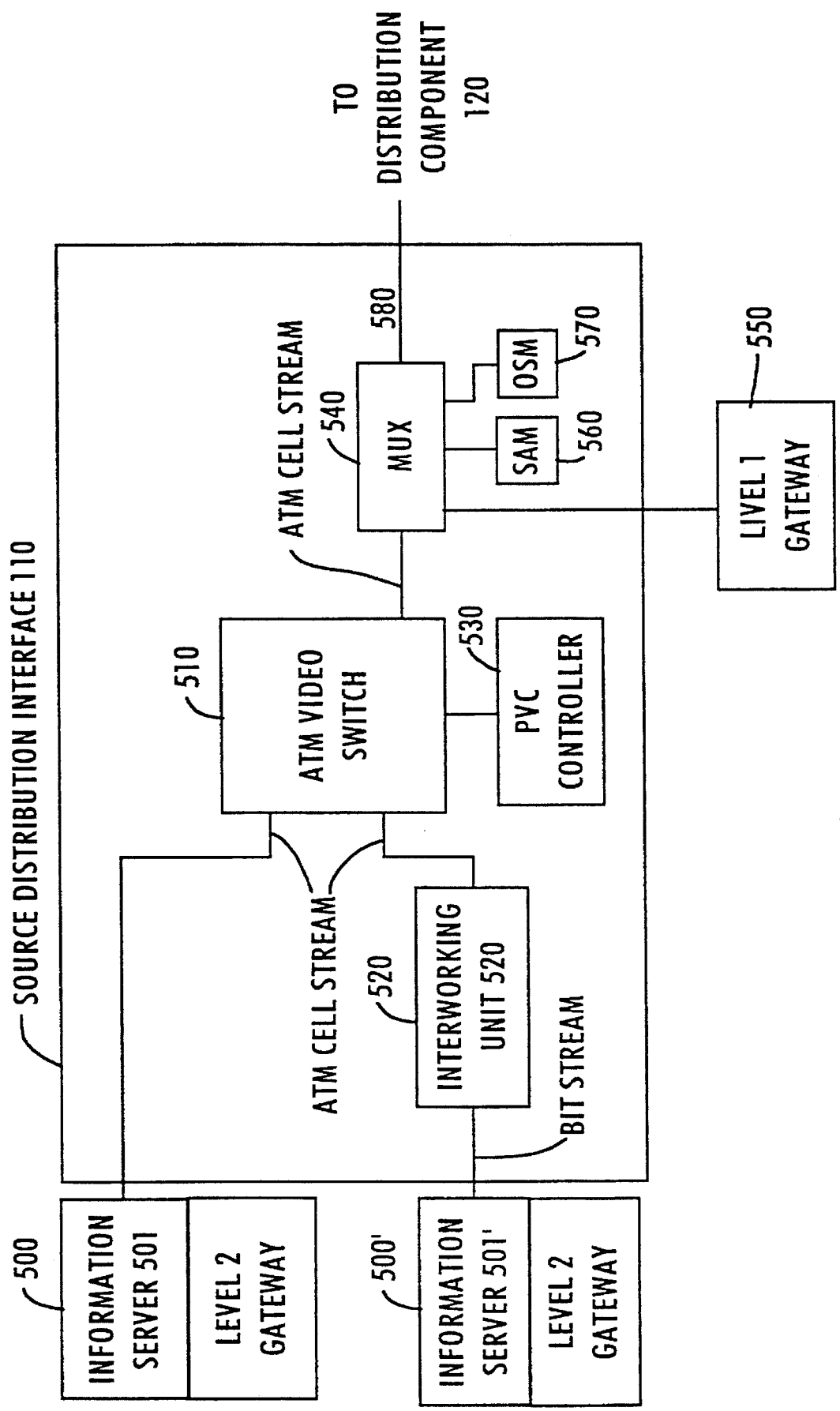
FIG. 5 represents a source interface for connecting information providers such as video servers to the distribution component of the network.

In addition to broadcast video, the full service digital network also offers subscribers access to other wideband services such as video-on-demand and interactive multimedia services. As shown in FIG. 5, access to these additional services is through ATM switch 510. Access through this switch is controlled by the level 1 gateway 550. Each of the non-broadcast information providers 500, 500', have some form of server 501, 501' and typically a level 2 gateway 502, 502'. The information service provider (ISP) 500 may have a system which provides ATM cell stream outputs for transmission through the network. Alternatively, the ISP may supply only bit stream data. In the latter case, the network operator would provide an interworking unit 520 to convert the bit stream data into ATM cell stream format compatible with the full service digital network. The ATM switch 510 transmits selected ATM cells via optical fibers 580 to the distribution component 120.

To establish a communication session or connection through the network between an information service provider and a particular subscriber end device (e.g., the digital entertainment terminal described hereinafter with respect to FIGS. 13 and 14) requires establishment of a virtual circuit through ATM switch 510 and the distribution component 120.

Figure 16:
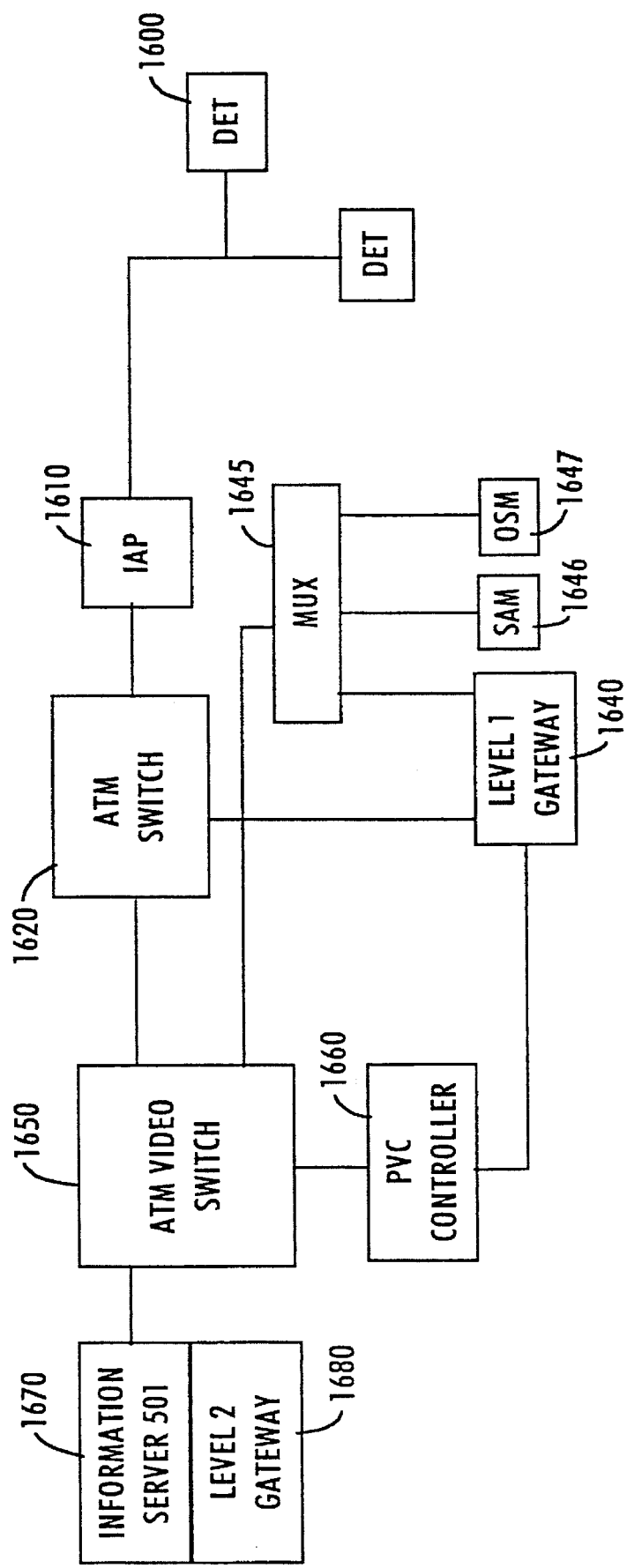
FIG. 16 is a representation of the network architecture useful for explaining operation of the network when access to the level 1 gateway occurs over an ATM switch.

In the full service digital network, a PVC (permanent virtual circuit) controller 530 stores data tables defining possible virtual circuits through the ATM switch 510 and the distribution component 120 to each terminal (e.g. digital entertainment terminal (DET) 1600 of FIG. 16) of the subscriber subscribing to particular ISP services. These data tables define the header information and the particular fiber output needed to route cells to the correct distribution component as well as to the particular subscriber port servicing the DET requesting the service. The tables define permanent virtual circuits between the ISP's and the DET's.

Establishment of a session between the DET and the information service provider will be discussed in some detail with respect to FIGS. 15 and 16 hereinafter.

The distribution component of the full service digital network is preferably an ATM switch or a network of ATM switches. In other embodiments, digital cross-connect switches (DCS) could be utilized. Yet other embodiments could utilize a bridging network for the distribution component. Yet other embodiments could utilize hybrid techniques combining these different technologies.

Figure 6:
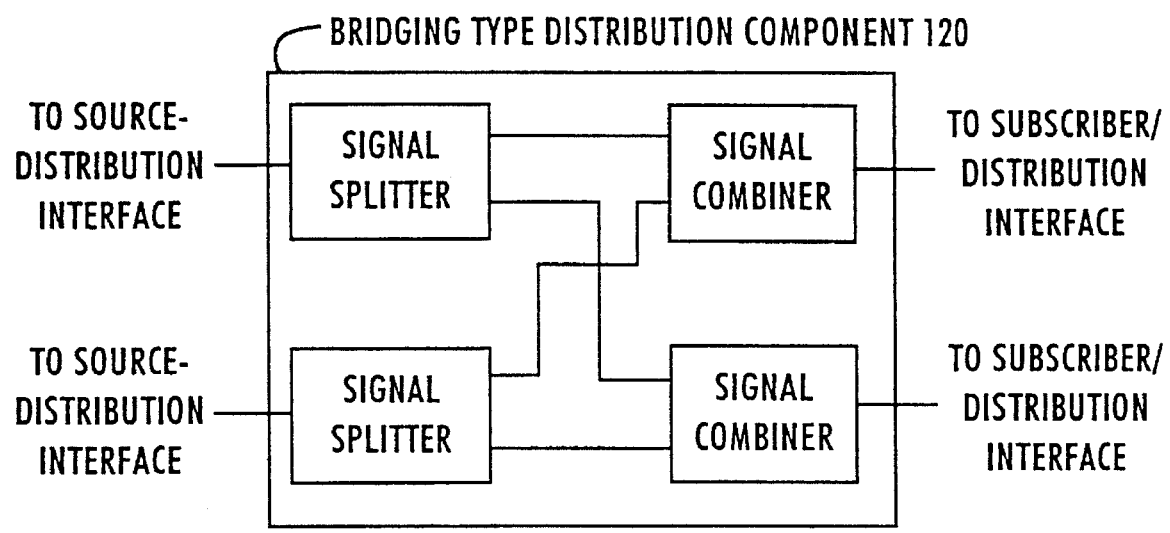
FIG. 6 represents a bridging arrangement for distributing information from the information sources to subscribers.

In the embodiment shown in FIG. 6, a bridging network distribution component 120 is utilized. Essentially, information from all sources is replicated and a copy of all source information is available to each subscriber-distribution interface. This would be particularly useful when distributing broadcast (e.g., CATV) information in which the cell stream is monitored to determine, from MPEG-2 encoded information which program a particular ATM cell is associated with. A subscriber distribution interface would then select only those ATM cells, the contents of which belong to the desired programming for forwarding to the subscriber.

Figure 7:
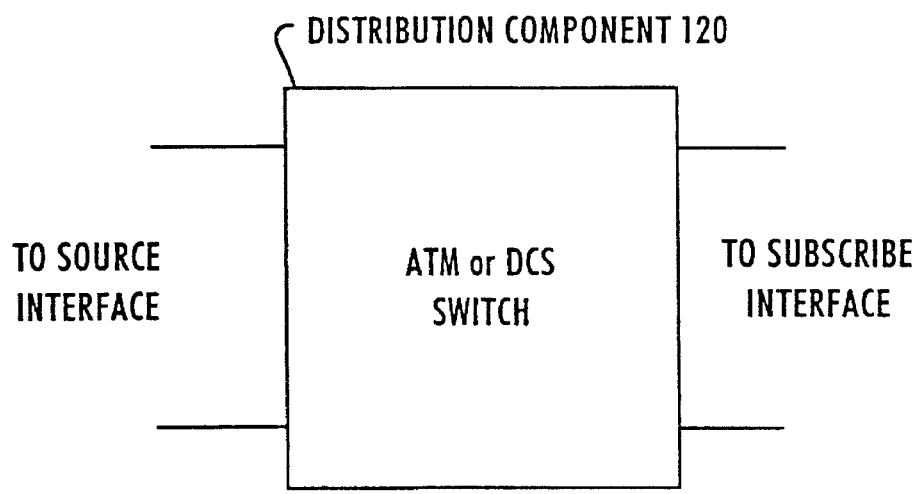
FIG. 7 represents a switching arrangement for distributing information from the information sources to subscribers.

As shown in FIG. 7, the distribution component 120 constitutes an ATM switch. Addressing information received on the incoming ATM cells specifies a particular subscriber distribution interface and the particular outgoing time slot of that interface associated with the destination. The way in which an ATM switch call is established is discussed more in detail with reference to FIGS. 15 and 16. Alternatively, a digital cross-connect switch (DCS) could be used to link sources of information to subscribers.

Figure 8:
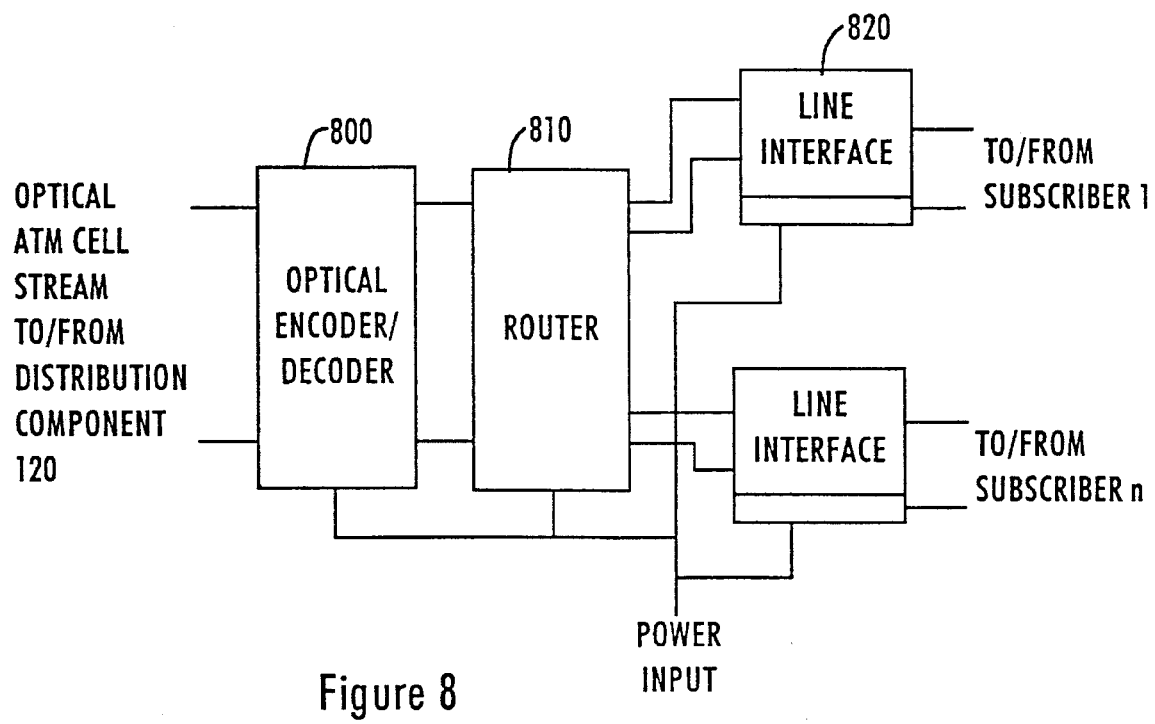
FIG. 8 represents an optical network unit for passing information from the distribution component of the network to subscribers.

FIG. 8 depicts an optical network unit (ONU) which serves as one type of subscriber interface. An optical network unit services a plurality of subscriber lines. The optical ATM cell stream (SONET or otherwise) from the distribution component is converted by optical encoder/decoder 800 into an electrical stream of ATM cells. Router 810 is essentially a mini ATM switch which detects cell header information and routes it to an appropriate line interface port 820 which is specified by the address in the ATM cell. The output of line interface 820 is a time division multiplex signal with a number of time slots equal to the maximum number of digital entertainment terminals, preferably 4, which can be located at a single subscriber premises. One time slot is dedicated to each DET. When an ATM cells is received at optical encoder/decoder unit 800 and provided to the router, the router makes a determination as to whether the cell is addressed to one of the line interface units serviced by that router, and, if it is, the router directs the cell to the proper line interface unit and to a proper buffer servicing the dedicated time slot associated with the DET to which the ATM cell is directed. Alternatively, the output of line interface 820 can service a wireless network node such as a personal communication service network node.

In a preferred embodiment, the line running between the line interface 820 and the subscriber is coaxial cable, and TDM video information, telephone information and power are all transmitted over coaxial cable. Alternatively, telephone information and power can be transmitted on one more twisted pairs in parallel with coaxial cable.

Figure 9:
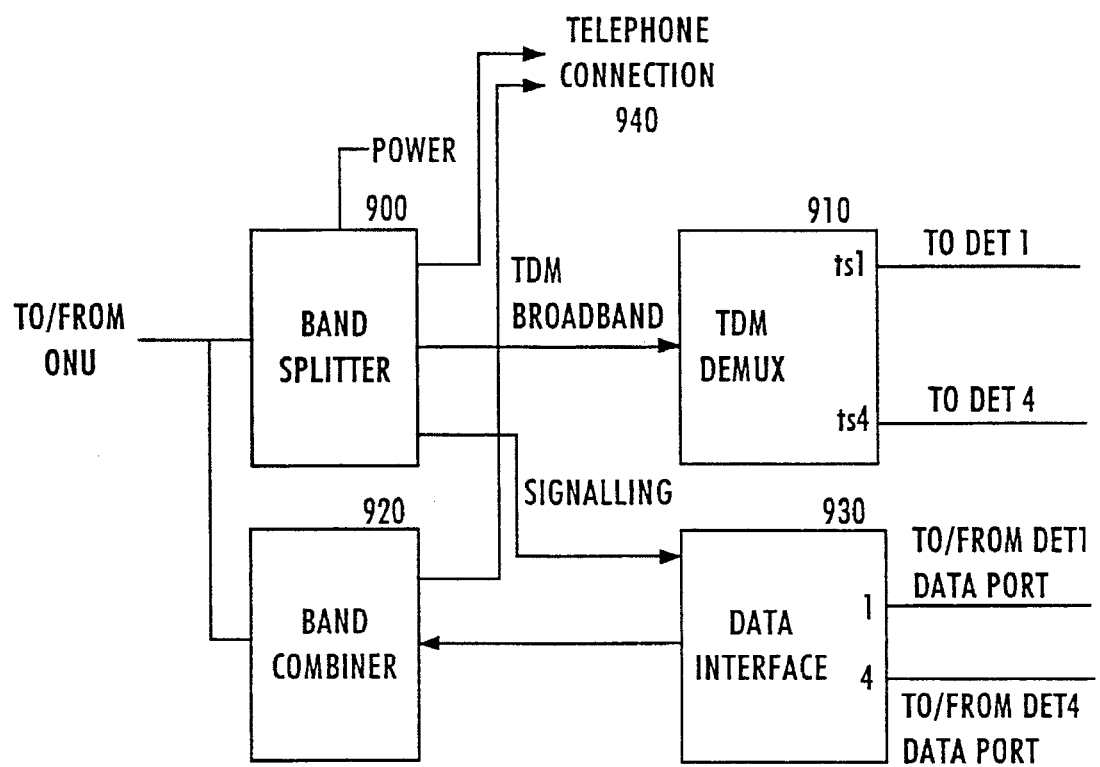
FIG. 9 represents a subscriber interface for connection subscriber equipment to an optical network unit of FIG. 8.

FIG. 9 shows a subscriber interface at the subscriber end of the coaxial cable linking the subscriber to the optical network unit. In the preferred embodiment, splitter 900 receives the combined output of the optical network unit over coaxial cable and splits it into a TDM broadband component going to TDM demultiplexer 910, a telephone component going to telephone connection 940, a narrowband signaling component going to data interface 930 and to a power output providing power to the interface and to the DET.

In the reverse direction, the combiner 920 receives narrowband signaling information from data interface 930 and from the telephone connection 940 and combines that information into a composite for upstream transmission to the ONU. TDM demultiplexer 910 has one output for each possible DET to be serviced at the subscriber premises.

Figure 10:
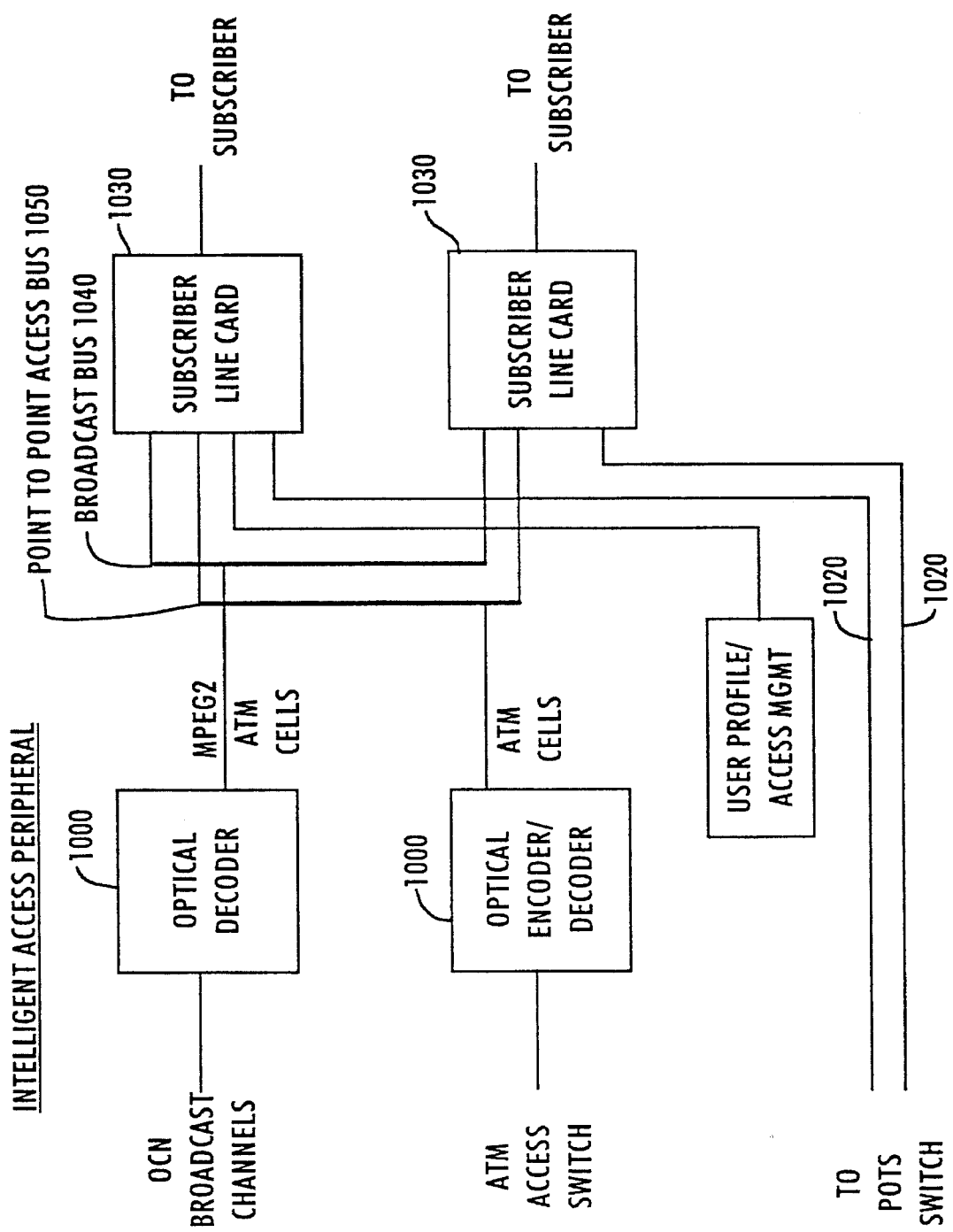
FIG. 10 represents an intelligent access peripheral for passing information from the distribution component of the network to subscribers.

FIG. 10 is an intelligent access peripheral (IAP) which is utilized in another embodiment of the full service digital network. In this embodiment, the IAP is the principal interface between the distribution component and the subscriber. Each IAP has three distribution-side ports. On one port, broadcast video is received in ATM cell format transported by SONET OC-N optical fibers and connected to optical decoder 1000. The second access port receives a second ATM cell stream from the distribution component and connects it to optical encoder/decoder 1010. The third input port is from a POTS (plain old telephone service) switch and connects to individual subscriber lines 1020. The output of optical decoder 1000 is preferably an MPEG-2 ATM cell stream which is fed to a separate broadcast bus 1040 to which each of subscriber line cards 1030, 1030' are connected. This subscriber line card monitors the broadcast bus for MPEG-2 header information which identifies the particular programming desired by this subscriber. When a particular cell is identified as containing such programming, the subscriber line card extracts the ATM cell for transmission to the subscriber. The output of optical encoder/decoder 1010 is an ATM cell stream which handles non-broadcast (e.g., point-to-point addressed) data. This data can be narrowband data or broadband data (e.g., video-on-demand) destined specifically for the subscriber connected to a particular line card addressed in the ATM cell header information. When a subscriber line card detects an ATM cell in the cell stream on the point-to-point bus 1050 which is addressed to a port serviced by the line card, it extracts the packet from the cell stream for transmission to the subscriber to which it is addressed.

The IAP implementation of the full service digital network also includes a service administration module (SAM), as shown for example in FIG. 16, which maintains a data base for customer profile data, e.g., data regarding authorized broadcast services and/or maximum bandwidth available to each customer. The SAM sends and receives signaling data as ATM cells through the distribution component. In this manner, the SAM can communicate with subscriber DETs to change subscription authorizations and with the level 1 gateway and the ISP's to control supply of specific services to individual customers.

For example, the SAM will upload the service profile data to an IAP for each of the subscribers serviced by that IAP. Each time a subscriber selects a broadcast channel, the IAP checks out subscriber profile data to determine if the subscriber is authorized to receive the selected channel. The IAP routes the ATM cells for the selected channel to the subscribers DET only if the profile data indicates that the subscriber is authorized to receive the particular channel selected. The SAM will upload new profile data to the IAP each time subscriber information is filed and the data base changes, typically in response to new subscription information from the subscriber or in response to changes entered by a VIP (e.g., to cancel service to a subscriber who has failed to pay outstanding bills).

Figure 11:
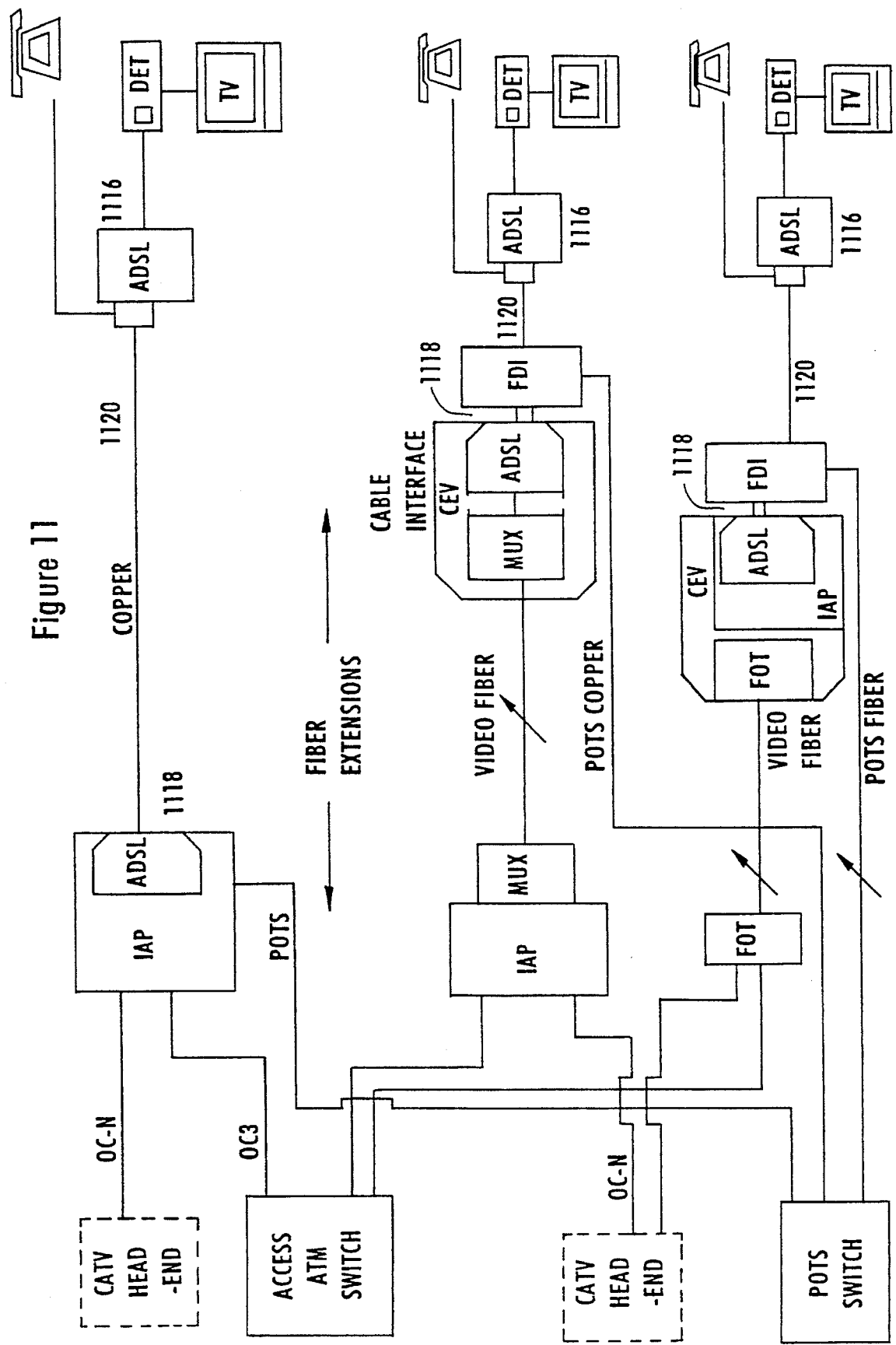
FIG. 11 represents implementations of ADSL technology used for connecting sources of information to the subscribers when using an intelligent access peripheral.

The subscriber line card 1030, 1030' of FIG. 10 can include ADSL interface circuitry of the type set forth in the aforesaid Litteral patent. Such a connection is illustrated in conjunction with the top IAP in FIG. 11. The bottom two IAPs in the architecture shown in FIG. 11 depict respectively different ways of extending the range of ADSL technology utilizing fiber connections.

Figure 12:
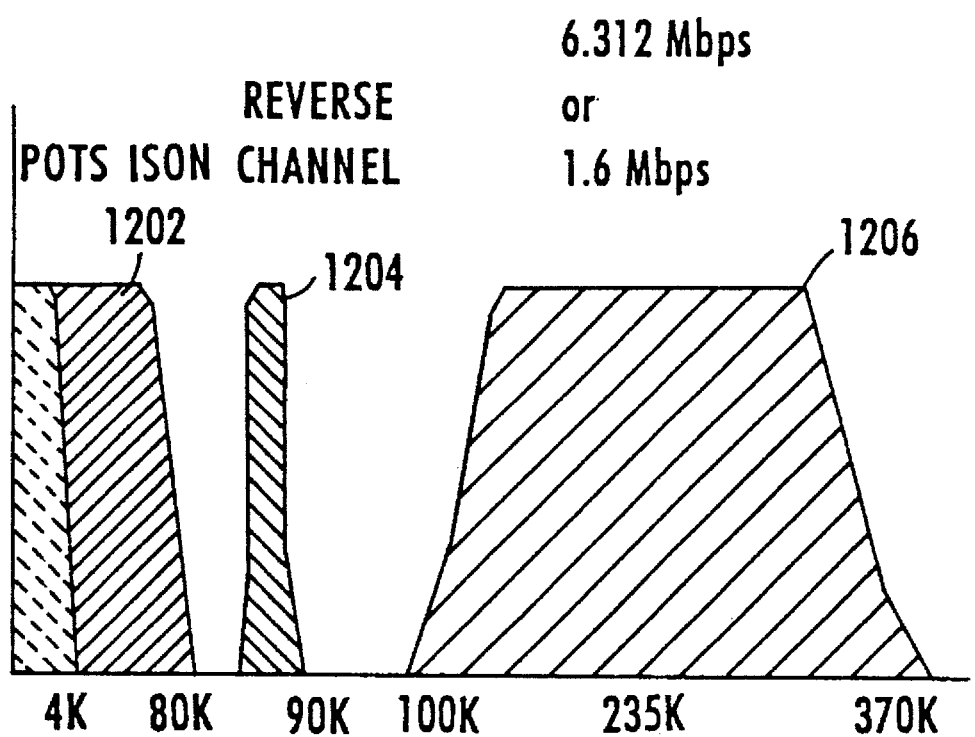
FIG. 12 describes typical spectrum allocations when utilizing ADSL technology.

FIG. 12 depicts the spectrum of the ADSL output. ADSL units multiplex data onto subscriber loops using frequency multiplexing to divide the available loop bandwidth into three channels 1202, 1204 and 1206. Baseband audio and signaling below 4 kilohertz (kHz) provide connectivity for a conventional telephone services (POTS). If ISDN were utilized, ISDN channel requirements consume the bottom 80 kHz of loop bandwidth. Reverse channel digital packet information provides 8 kilobits per second (kbps) of handshaking protocol between the customer- and trunk-side ADSLs 1116, 1118 (e.g., FIG. 11) to test the copper pair transmission path, and approximately 16 kbps connectivity from the subscriber premises to a packet switched network, such as an X.25 or ISDN network over, e.g., D-channel interfaces. The 16 kbps signal is stripped by the ADSL 1118 and sent to the central office (CO).

In one embodiment, compressed digital video information is contained within the frequency range of about 100 and 500 kHz to provide a 1.6 mbps channel for transporting video/audio data over respective loops 1520 to customer premises 100. However, in a preferred embodiment, 6.312 Mhz of bandwidth is provided to accommodate MPEG-2 encoded video information.

The frequency channel represented by range 1202 in FIG. 12 establishes a 2-way channel used to provide standard POTS service or ISDN (2B+D) service over the ADSL line. Channel 1204 is an up-stream only (subscriber to CO), low speed data channel. Eight kbps of this channel is used for transfer of operations, administration, maintenance, and provisioning (OAM&P) data for the ADSL unit. The remaining 16 kbps, compatible with D channel interfaces of ISDN or with X.25 protocol, is used to interface with an ISDN or X.25 packet switch for allowing the subscriber to interact with the network and/or the Information Service Provider (ISP).

Channel 1206 carries a down-stream only (CO to subscriber) digital signal providing the digitized compressed video signal. The lower edge of channel 1206 is set at 100 kHz., chosen to minimize channel loss and allow appropriate bandwidth for base band channel 1202 and reverse channel 1204 and to minimize interference from impulse noise.

A down-stream control signal to the subscriber (not shown in FIG. 12) is time division multiplexed with the video signal on the carrier. This down-stream control signal, together with the digitized compressed video signal and overhead, occupies a bit rate band of about 1.6 mbps in one embodiment or 6.312 mbps in a MPEG-2 embodiment. All necessary multiplexing and demultiplexing of the telephone service, control and video information signals in the frequency and time domains are carried out by the ADSL units (e.g., 1116 and 1118 of FIG. 11).

Figure 13:
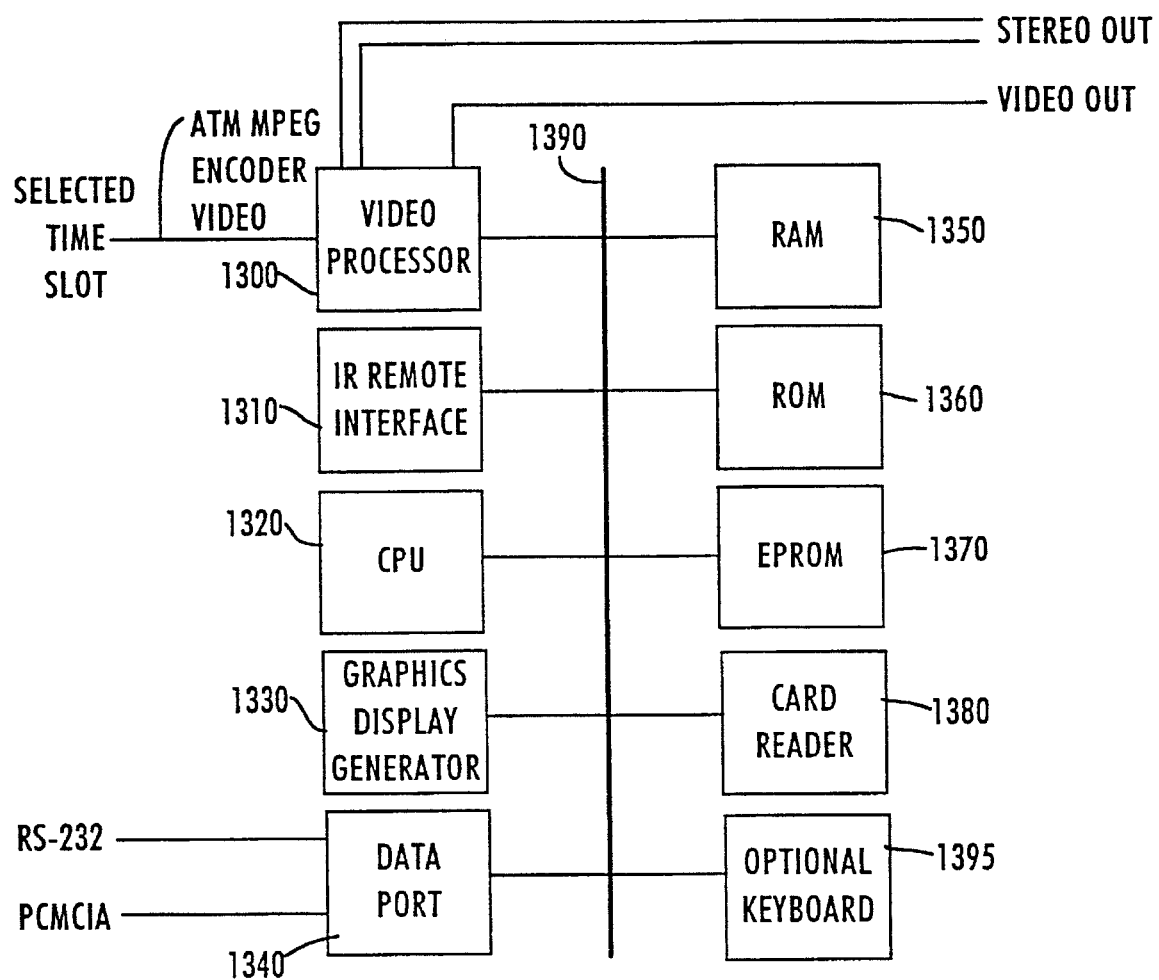
FIG. 13 shows a view of the hardware architecture of the digital entertainment terminal utilized at subscriber premises.

FIG. 13 represents the hardware architecture of one type of digital entertainment terminal utilized at subscriber premises. Signals received from either the ONU or the IAP have been separated into particular components prior to reaching the DET. ATM MPEG encoded video from either a selected time slot of the ONU or from coax of an IAP, or from the ADSL is applied to video processor 1300. The functional operation of the video processor is depicted in FIG. 14 and will be discussed hereinafter. All of the devices shown in FIG. 13 connect to a bus 1390 controlled by CPU 1320. Infrared Remote Interface 1310 operates to receive and/or send control signals (e.g., channel selected signals) from/to (e.g., a hand-held remote unit. Data port 1340 provides bi-directional data communications to and from the full service digital network. The data ports may be typically RS232 or PCMCIA standard. Card reader 138 is optional and can be used for direct credit card billing of a subscriber for particular services. The remaining devices in the hardware architecture are self-explanatory.

Figures 14, 15:
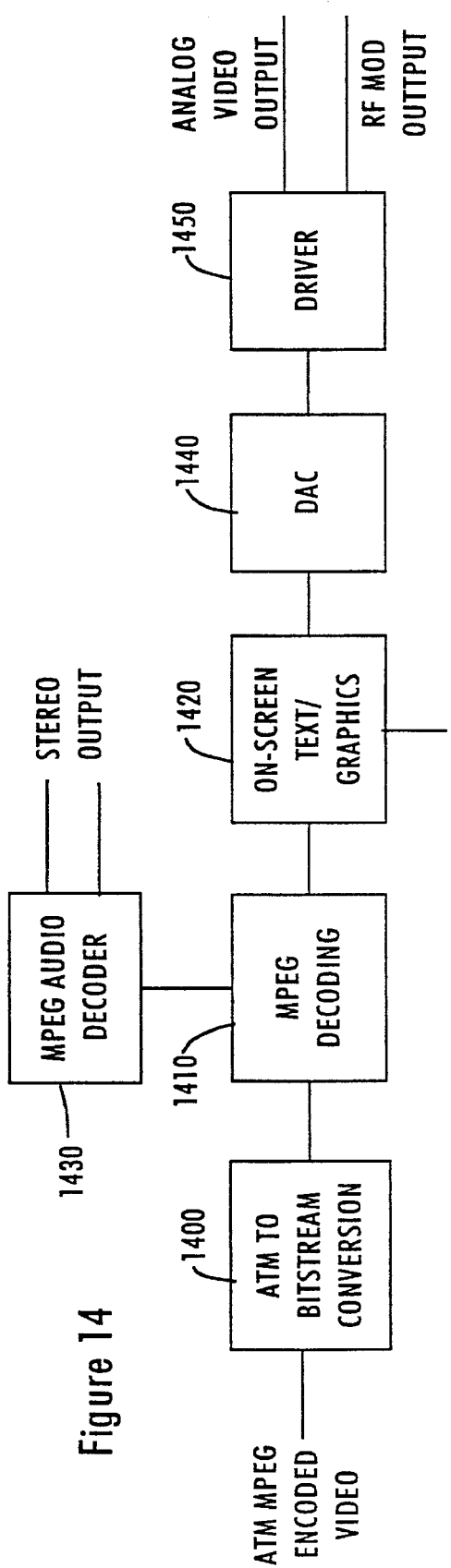
FIG. 14 represents the functions performed by the video processor of the digital entertainment terminal.
FIG. 15 is a representation of the network architecture useful for explaining operation of the network when access to the level 1 gateway occurs over an X.25 network.

The DET video processor 1300 is depicted functionally in FIG. 14. ATM MPEG encoded video is applied to converter 1400 where the ATM cell format is converted to MPEG bit stream format. MPEG bit stream format is applied to MPEG decoder 1410 where the MPEG encoded signal is decoded into audio information applied to MPEG audio decoder 1430 and MPEG video information which is applied to on-screen text/graphics generator 1420 where graphics and text generated by graphics display generator 1330 controlled by the CPU may be applied to form a composite digital image. Alternatively, the on-screen text/graphics generator could be located after digital-to-analog converter 1440 where it would operate in the analog mode. The decoded and/or overlayed video information is then applied to driver 1450 where analog baseband video output is generated on the analog output terminal and an RF modulated version of that output is generated on the RF modulated output. Typically, the RF modulated output would be applied to a television set in the position of broadcast channel 3 or 4.

The operation of the full service digital network will be described in connection with one full service network embodiment depicted in FIG. 15. When the subscriber desires to watch television or engage in one of the other services provided by the network, the subscriber activates the digital entertainment terminal (DET) 1500 either manually or by a remote control to "turn it on." Turn on may either be an actual power-up or an activation of a DET already powered up. When the DET is turned on, a message is sent over the subscriber link to the ONU which services the DET. ONU's are typically located in concentrator bays. The ONU 1510 knows the port associated with the DET which has been activated by virtue of either explicit addressing or by virtue of the time slot position of the incoming data. The ONU then initiates an X.25 connection to the Level 1 gateway either by way of the distribution component 1520 and an X.25 access network 1530 or by way of ONU 1510 or its concentrator and the X.25 network. The level 1 gateway then downloads a menu to the DET which has been activated. The menu typically includes the services available to the subscriber at that DET. The subscriber selects a particular service to be invoked and a selection message is sent from the DET to the ONU where it is routed over the X.25 connection to the level 1 gateway. The level 1 gateway knows, by virtue of addressing information applied by the ONU, the ONU number, ONU port number and time slot associated with the DET which requested service. If the service requested is a premium service, such as video-on-demand, the level 1 gateway initiates a connection via the X.25 network to the an information server 501 or to the ISP. It notifies the IS of a billing number associated with the subscriber. The server then notifies the level 1 gateway over the reverse path whether or not service is authorized to the subscriber. If service is not authorized, the level 1 gateway will provide a message to the DET and, depending on circumstances, may provide the DET user with an opportunity to subscribe to the service.

If the connection is authorized, the level 1 gateway notifies the PVC controller to activate a permanent virtual circuit between a server port identified by information returned from the server and the port number of the DET desiring the service. Once a communication session is established between the server and the DET requesting service, management of the communication session is transferred to the level 2 gateway of the server and the X.25 connections are broken down between the level 1 gateway and the DET and between the level 1 gateway and the server.

If the subscriber desires to change services, the subscriber may terminate the session with the level 2 gateway and then initiate a new session for establishment of the new service by way of the level 1 gateway.

FIG. 16 will be utilized to explain the operation of the full service digital network in another embodiment utilizing an intelligent access peripheral (IAP). As before, when a DET being serviced by an IAP is turned on, a message is sent to the IAP over an upstream ADSL signaling channel. The IAP then initiates a connection to the level 1 gateway which is directly serviced by a port on the ATM switch and the level 1 gateway downloads a menu as before. When the subscriber desires a particular service, and selects that service, a message is sent to the IAP. The IAP checks the class of service authorizations contained within user profile/access management unit 1040 to see if the service is authorized to the requesting subscriber. If the service is authorized, the request for services is passed on to the level 1 gateway.

At the level 1 gateway, the particular service selected is identified and a message is sent to the IS 501 over ATM video switch 1650 and multiplexer 1645. If the server is willing to accept the connection, the server notifies the level 1 gateway over the reverse path and the level 1 gateway specifies the port numbers of the server and the DET to be connected via ATM switches 1650 and 1620. Once a direct connection between the DET and the IS is established, session management is transferred to the level 2 gateway 1680 of the information service provider and connections utilized to set up the call over the ATM switches between the DET and the level 1 gateway and between the level 1 gateway and the ISP are broken down in favor of the direct connection between the DET and the ISP.

In this disclosure, there is shown and described the preferred embodiments of the invention, but, as aforementioned, it is to be understood that the invention is capable of use in various other combinations and environments and is capable of changes or modifications within the scope of the inventive concept as expressed herein.

We claim:

1. A network for the distribution of information, including video information, to subscribers comprising:

one or more sources of video information;

one or more distribution components providing the information to a plurality of subscribers;

a source interface for connecting one or more sources of video information to said distribution component;

a subscriber interface connecting subscribers to said distribution means;

a first gateway authorizing establishment of a connection between a source of video information and a subscriber;

a signalling network selectively connecting a subscriber to said first gateway, and one or more video bridging devices which provide duplicate copies of output signals from said one or more sources of video information to a plurality of distribution components.

2. A network for the distribution of information, including video information, to subscribers comprising:

one or more sources of video information;

one or more distribution components providing the information to a plurality of subscribers;

a source interface for connecting one or more sources of video information to said distribution component;

a subscriber interface connecting subscribers to said distribution means;

a first gateway authorizing establishment of a connection between a source of video information and a subscriber; and a signalling network selectively connecting a subscriber to said first gateway, in which the source interface includes an ATM video switch.

3. The network of claim 2 in which said ATM video switch includes a permanent virtual circuit (PVC) controller controlled by said gateway.

4. The network of claim 3 in which the first gateway means initiates a connection between a source of video information and a subscriber by communicating with said PVC controller.

5. A network for the distribution of information, including video information, to subscribers comprising:

one or more sources of video information;

one or more distribution components providing the information to a plurality of subscribers;

a source interface for connecting one or more sources of video information to said distribution component;

a subscriber interface connecting subscribers to said distribution means;

a first gateway authorizing establishment of a connection between a source of video information and a subscriber; and a signalling network selectively connecting a subscriber to said first gateway, in which said subscriber interface comprises an optical network unit (ONU).

6. The network of claim 5 in which the optical network unit is connected to said distribution component by one or more optical fibers.

7. The network of claim 6 in which the optical fibers operate in accordance with SONET standards.

8. The network of claim 5 in which data is sent from said distribution component to said ONU, and the data is synchronous data in ATM cell format.

9. The network of claim 5 in which data is sent from said distribution component to said optical network unit in one or more dedicated time slots for each subscriber end device serviced by the ONU.

10. The network of claim 5 in which a connection between the ONU and a subscriber is coaxial cable or twisted pair or both.

11. The network of claim 5 in which a power source at the ONU powers the ONU and subscriber end devices.

12. The network of claim 9 in which the subscriber end device is a digital entertainment terminal.

13. The network of claim 9 in which the ONU services a wireless network node.

14. The network of claim 13 in which the wireless network node is a personal communication service network node.

15. A network for the distribution of information, including video information, to subscribers comprising:

one or more information servers;

an ATM video switch;

one or more optical network units;

one or more distribution switches selectively connecting information received from said one or more information servers over said ATM video switch to said optical network units;

one or more groups of one or more digital entertainment terminals serviced by respective ones of said optical network units;

a level 1 gateway, with a port on said ATM switch; and a signalling network connecting digital entertainment terminals to the level 1 gateway via respective optical network units;

whereby a digital entertainment terminal connects to the level 1 gateway to obtain services of the information servers.

16. The network of claim 15 in which said distribution switch is a digital cross-connect switch.

17. A network for distribution of information, including video information, to subscribers comprising:

one or more sources of digitized video information;

a distribution component providing the information to a plurality of subscribers;

a source interface for connecting said one or more sources of video information to said distribution component;

a subscriber interface providing each subscriber a communication connection to said distribution means;

means authorizing establishment of connection between a source of video information and a subscriber interface through said distribution component.

18. The network of claim 17 wherein the means authorizing establishment of a connection further includes a signalling network.

19. The network of claim 17 in which the source interface includes an ATM video switch.

20. A network for the distribution of information, including video information, to subscribers comprising:

one or more information servers;

an ATM video switch;

one or more subscriber interface units;

one or more distribution switches selectively connecting information received from said one or more information servers over said ATM video switch to said subscriber interface units;

one or more groups of one or more digital entertainment terminals serviced by respective ones of said subscriber interface units;

a level 1 gateway, with a port on said ATM switch; and a signalling network connecting digital entertainment terminals to the level 1 gateway via respective subscriber interface units;

whereby a digital entertainment terminal connects to the level 1 gateway to obtain services of the information servers.

21. A network for the distribution of information, including video information, to subscribers comprising:

one or more sources of video information;

one or more distribution components providing the information to a plurality of subscribers;

a source interface for connecting one or more sources of video information to said distribution component;

a subscriber interface connecting subscribers to said distribution means;

a first gateway authorizing establishment of a connection between a source of video information and a subscriber; and a signalling network selectively connecting a subscriber to said first gateway, in which the source interface includes an ATM video switch, and in which a PVC controller is connected via a level 1 gateway to a signalling network capable of transmitting signalling to the PVC controller.

22. The network of claim 21 in which the signalling network is X.25 network.

23. A network for distribution of information, including video information, to subscribers comprising:

one or more sources of digitized and compressed video information;

a distribution component providing the information to a plurality of subscribers;

a source interface for connecting said one or more sources of video information to said distribution component;

a subscriber interface providing each subscriber a communication connection to said distribution means;

means authorizing establishment of connection between a source of video information and a subscriber interface through said distribution component, in which the source interface includes a network of ATM switches.

24. The network of claim 23 in which the subscriber interface receives channel selection signals from the subscriber and extracts data from the distribution component which corresponds to the channel selected for transmission to the subscriber.

25. The system of claim 24, further comprising:

a second source of digitized video information;

means for formatting digitized video information from said second source and as asynchronous transfer mode (ATM) cells; and means for controlling said ATM network so as to selectively route information from said first source to a first one of the digital entertainment terminals and to selectively route information from said second source to a second one of the digital entertainment terminals.

\* \* \* \* \*